(12) United States Patent
Reszewicz et al.

(10) Patent No.: US 10,794,503 B2
(45) Date of Patent: Oct. 6, 2020

(54) METHOD FOR LOCATING CHECK VALVE PIN

(71) Applicant: Hamilton Sundstrand Corporation, Charlotte, NC (US)

(72) Inventors: Modest Reszewicz, Wrocław (PL); Pawel Czarnecki, Świdnica (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 31 days.

(21) Appl. No.: 15/993,656

(22) Filed: May 31, 2018

(65) Prior Publication Data

US 2018/0355985 A1    Dec. 13, 2018

(30) Foreign Application Priority Data

Jun. 12, 2017 (EP) ..................................... 17461547

(51) Int. Cl.
    *F16K 15/03*      (2006.01)
(52) U.S. Cl.
    CPC .......... *F16K 15/038* (2013.01); *F16K 15/033* (2013.01)
(58) Field of Classification Search
    CPC .. F16K 15/038; F16K 15/033; F16K 27/0209; G05D 7/0173; Y10T 137/7897–7903
    See application file for complete search history.

(56) References Cited

U.S. PATENT DOCUMENTS 3,074,427 A * 1/1963 Wheeler, Jr. ............. F16K 1/223
                                                        137/512.1
3,452,778 A * 7/1969 Babcock ............... F16K 15/038
                                                        137/512.1
4,694,853 A * 9/1987 Goodwin ............... F16K 15/038
                                                        137/512.1
4,977,926 A * 12/1990 Hocking ............... A47B 96/068
                                                        137/512.1
5,318,063 A * 6/1994 Muddiman ........... F16K 15/038
                                                        137/454.2

(Continued)

FOREIGN PATENT DOCUMENTS

EP        3023676 A1     5/2016

OTHER PUBLICATIONS

European Search Report for Application No. 17461547.6-1751 dated Jan. 4, 2018 5 pages.

*Primary Examiner* — Jessica Cahill
*Assistant Examiner* — Patrick C Williams
(74) *Attorney, Agent, or Firm* — Cantor Colburn LLP

(57) ABSTRACT

A valve housing for a check valve comprises a housing body defining a valve opening and a first pin extending across the valve opening defining a pin axis (A). The valve housing further comprises a pair of first pin support elements provided on the housing body on opposing sides of the valve opening and extending towards the first pin, the first pin support elements for contacting and supporting an under side of the first pin. The valve housing further comprises a pair of first pin location elements provided on the housing body on opposing sides of the valve opening, each first pin location element comprising a strip element having a mounting portion mounted to the housing body and a locating portion which extends over an upper side of the first pin and around at least an upper circumference thereof to locate the first pin.

5 Claims, 6 Drawing Sheets

(56) References Cited

U.S. PATENT DOCUMENTS

| | | | | |
|---|---|---|---|---|
| 5,392,810 | A | * | 2/1995 | Cooper ................ F16K 15/038 137/512.1 |
| 7,954,509 | B2 | * | 6/2011 | Dulay ................... F16K 15/038 137/15.18 |
| 8,181,669 | B2 | | 5/2012 | Dehais et al. |
| 9,581,256 | B2 | | 2/2017 | Barone |
| 2008/0078459 | A1 | | 4/2008 | Warriner et al. |
| 2016/0040794 | A1 | | 2/2016 | Minta |

* cited by examiner

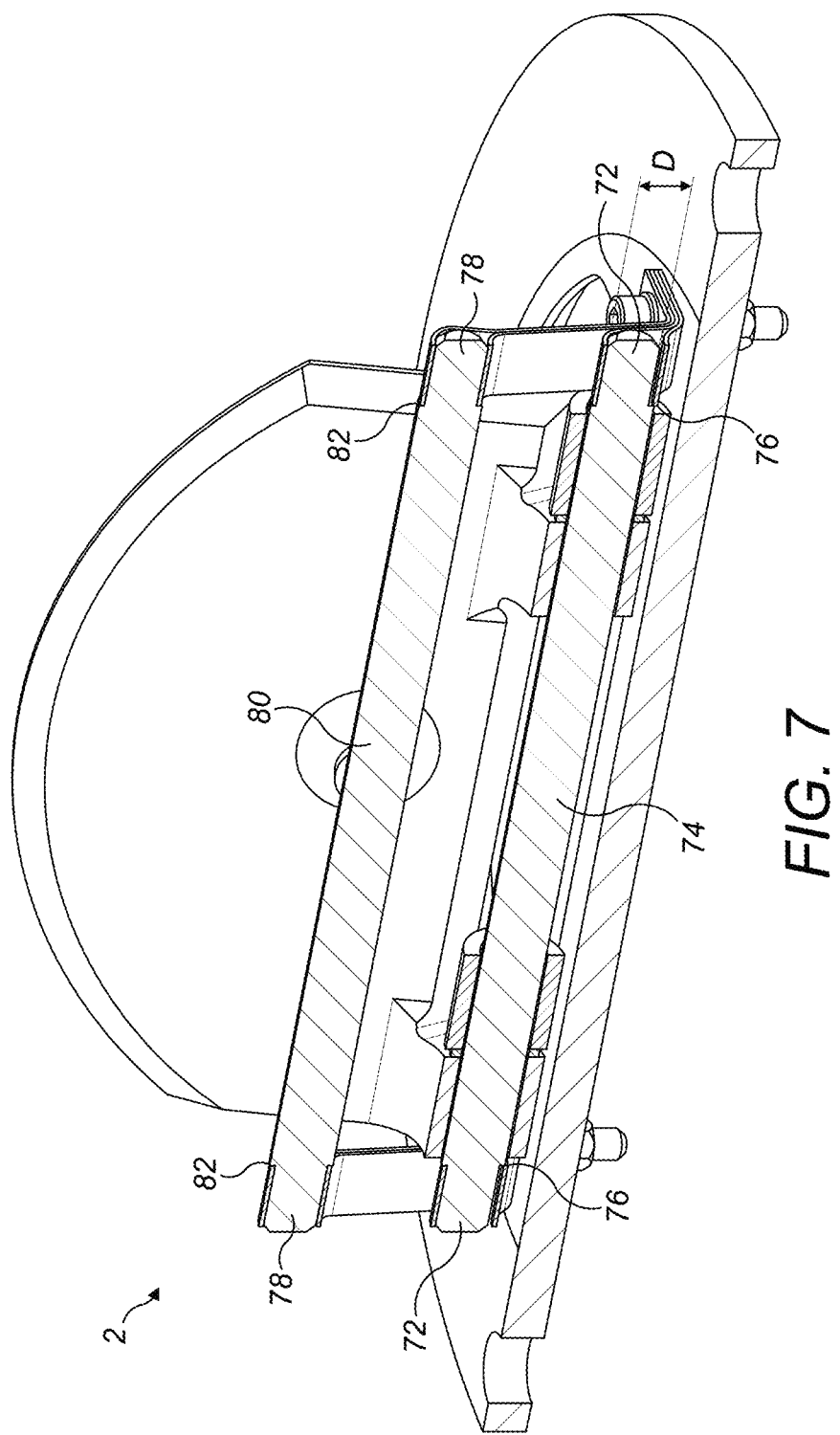

METHOD FOR LOCATING CHECK VALVE PIN

FOREIGN PRIORITY

This application claims priority to European Patent Application No. 17461547.6 filed Jun. 12, 2017, the entire contents of which is incorporated herein by reference.

TECHNICAL FIELD

The present disclosure relates to check valves, and in particular to valve housings for check valves

BACKGROUND

It is known to use check valves to allow fluid flow in one direction, and to prevent flow in the opposite direction. Check valves are used in a wide variety of applications, for example in air conditioning systems, more particularly in aircraft air conditioning systems.

Many types of check valves are known. Some check valves include hinged flappers that open in the direction of fluid flow. In such valves, when a fluid pressure exceeds a predetermined valve "cracking pressure", the flappers of the valve open to allow flow through the valve. Likewise, if significant pressure drops in the upstream fluid are experienced (such that there is a negative pressure differential across the valve), the flapper elements close, preventing flow reversal.

Such valves typically include a valve housing which comprises an opening or openings, sealed by flapper elements. The flapper elements are supported on a hinge pin, which is in turn supported by a pair of supports or posts on either side of the opening.

It may be desirable to minimise the mass of components, particularly those intended for use in aircraft. To this end, it is desirable to design components to be as light as possible while meeting structural demands.

Check valve structures must withstand frequent cycles of opening and closing. It is therefore also desirable that check valve components are resilient and durable.

SUMMARY

According to one embodiment of the present disclosure, there is provided a valve housing for a check valve. The valve housing comprises a housing body defining a valve opening, and a first pin extending across the valve opening defining a pin axis. The valve housing further comprises a pair of first pin support elements provided on the housing body on opposing sides of the valve opening and extending towards the first pin, the first pin support elements for contacting and supporting an under side of the first pin. The valve housing further comprises a pair of first pin location elements provided on the housing body on opposing sides of the valve opening, each first pin location element comprising a strip element having a mounting portion mounted to the housing body and a locating portion which extends over an upper side of the first pin and around at least an upper circumference thereof to locate the first pin.

At least one first pin support element, or both, may be formed integrally with the housing body.

At least one first pin support element may comprise a second strip element having a mounting portion mounted to the housing body and overlapped by the mounting portion of the associated first pin location element, and a pin support portion arranged below the first pin.

The first pin may be a stop pin for engaging a flapper element.

The first pin may be a hinge pin for mounting a pair of flapper elements.

The valve housing may further comprise a second, stop pin arranged above and parallel with the hinge pin, and a pair of stop pin support elements arranged above the hinge pin and below the stop pin, each stop pin support element comprising a third strip element having a stop pin supporting portion for contacting and supporting the stop pin and a mounting portion for mounting the stop pin supporting element to the housing body and overlapping the mounting portion of the associated first pin location element.

The valve housing may further comprise a pair of second pin location elements, each second pin location element comprising a fourth strip element having a mounting portion mounted to the housing body and a locating portion which extends over an upper side of the stop pin and around at least an upper circumference thereof to locate the stop pin, the mounting portion overlapping the mounting portion of an associated stop pin support element.

The locating portion of the second pin location element may extend through at least 180 degrees around the upper side of the stop pin.

The mounting portion of the first pin support element may be joined to the mounting portion of the second pin location element by a first fold-back bend, and the mounting portion of the first pin locating element may be joined to the mounting portion of the stop pin support element by a second fold-back bend.

Mounting portions of the respective elements may be joined by a braze or weld joint.

Each mounting portion may comprise a first mounting portion which extends away from the hinge pin in a first direction and a second mounting portion which extends away from the hinge pin in an opposite, second direction.

The valve housing may further comprise a fastener, passing through a respective first mounting portion of each strip element, and a second fastener passing through a respective second mounting portion of each strip element for fastening the strip elements to the housing body.

An upper surface of the first pin support element may be spaced from a lower surface of the first pin location element by a distance that is greater than a diameter of the first pin.

The locating portion of the first pin location element may extend through at least 180 degrees around the upper side of the first pin According to another aspect of the present disclosure, there is a check valve comprising the valve housing of the previous embodiments, and a pair of flapper elements rotatably mounted to the hinge pin of the valve housing.

BRIEF DESCRIPTION OF THE DRAWINGS

Some exemplary embodiments and features of the present disclosure will now be described by way of example only, and with reference to the following drawings in which:

FIG. 7 shows a sectional view of the check valve of FIG. 1.

DETAILED DESCRIPTION

Figure 1:
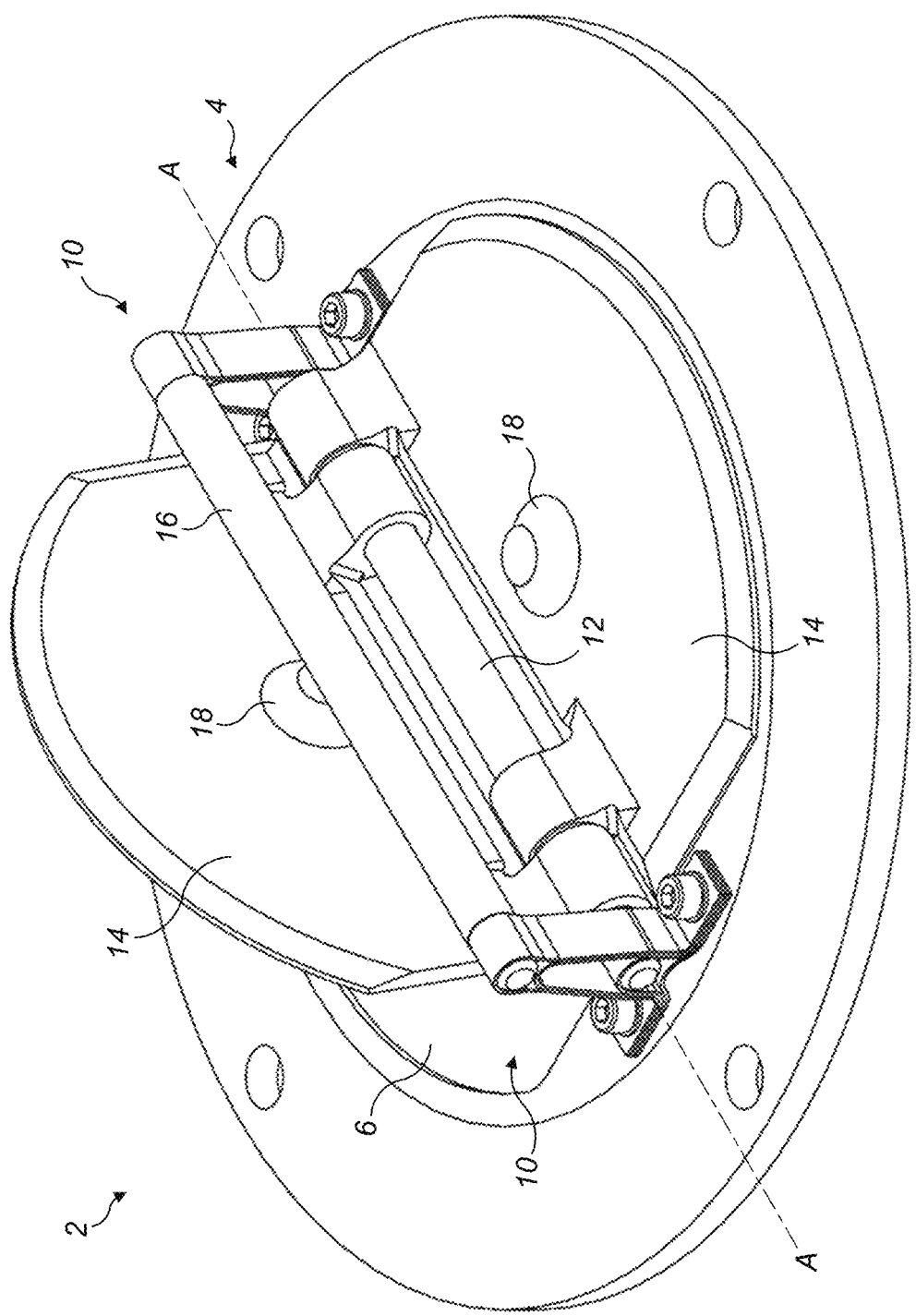
FIG. 1 shows a perspective view of a check valve in accordance with this disclosure.

With reference to FIG. 1, a flapper check valve 2 is illustrated. The check valve 2 is configured to be mounted around its periphery in or to, for example, a duct in order to prevent reverse flow of a fluid through the duct.

The check valve 2 comprises a valve housing 4, in this embodiment formed as a generally planar annular element. The valve housing 4 comprises a valve opening 6, in the illustrated embodiment a pair of valve openings 6 separated by a central web 8. In certain embodiments, the valve housing 4 may be integrally formed with the duct in which it is positioned.

A pair of mounting posts 10 are arranged on opposed sides of the valve housing 4 and extending upwardly therefrom. The pair of mounting posts 10 each support a first pin 12, also referred to as a hinge pin 12, extending parallel with the central web 8 between the two mounting posts 10 and defining a pin axis A. The check valve 2 includes a pair of flapper elements 14, which are pivotally supported on the hinge pin 12. The flapper elements 14 can pivot on the hinge pin 12 from a closed position to an open position. In the closed position, the flapper elements 14 sealingly engage with the valve housing 4 to seal the valve openings 6.

The pair of mounting posts 10 further support a second pin 16, also referred to as a stop pin 16. The stop pin 16 extends between the mounting posts 10 parallel to the hinge pin 12 and the central web 8, and is arranged above the hinge pin 12. The flapper elements 14 each comprise a stop 18, which engages with the stop pin 16 when the flapper element 14 is in the open position. In the embodiments illustrated, the stop 18 is formed as a raised pad on the surface of the flapper element. Other forms of stop 18 may be used within the scope of the disclosure, however.

Figure 2:
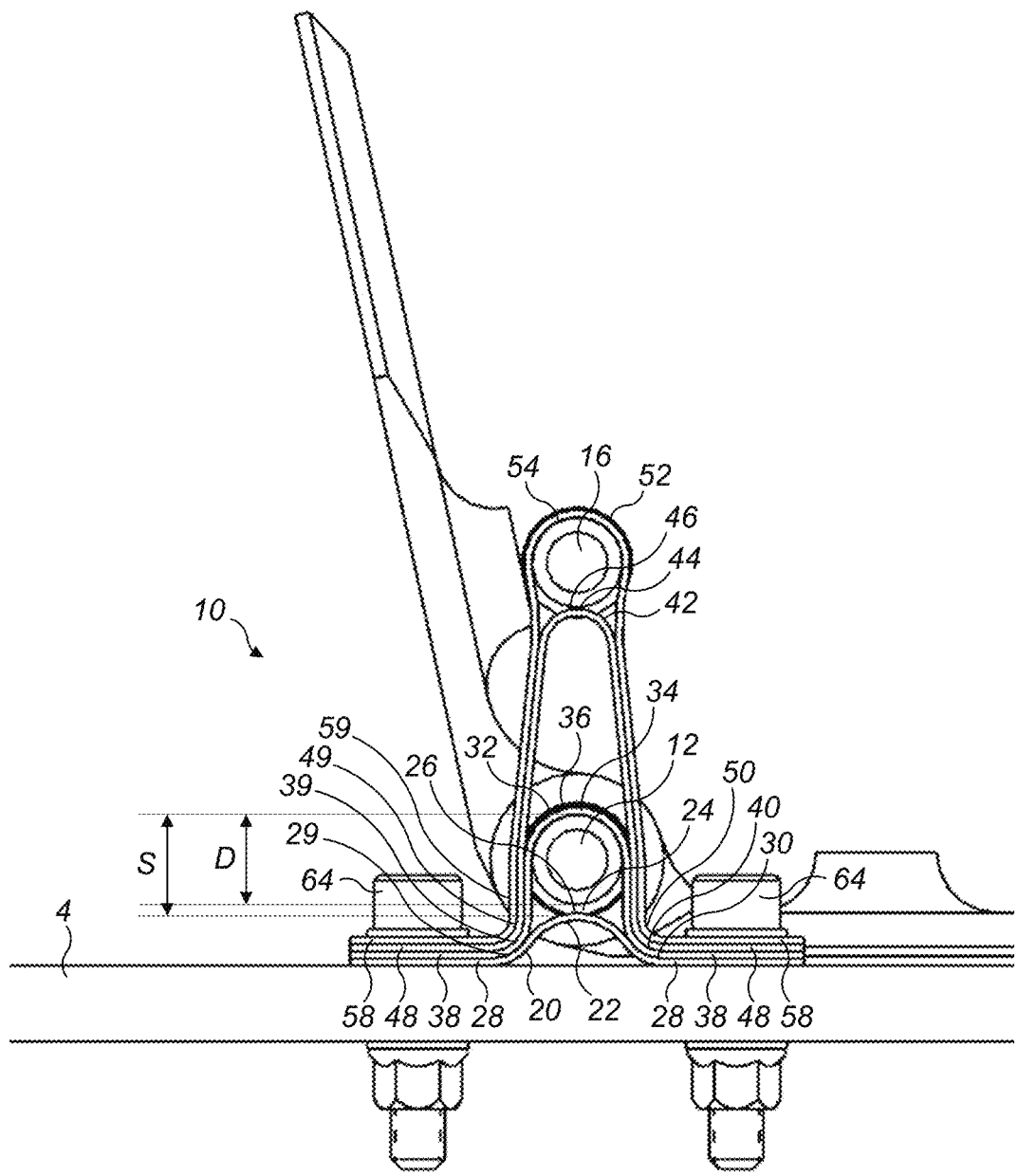
FIG. 2 shows a partial side view of an embodiment of the check valve of FIG. 1.

FIG. 2 shows a side view of the embodiment of the check valve 2 of FIG. 1 from a partial side view showing one of the pair of mounting posts 10. As discussed, the check valve 2 comprises two such mounting posts 10; each mounting post 10 may have the same features, or the pair of mounting posts 10 may have some dissimilar features.

The mounting post 10 comprises a plurality of elements. A first pin support element 20, also referred to as a hinge pin support element 20, is provided to support the first pin 12; in this example, the hinge pin 12. The hinge pin support element 20 is mounted on top of the valve housing 4 and below the hinge pin 12. The hinge pin support element 20 comprises a curved pin supporting portion 22, which is operable to support the hinge pin 12 through a tangential contact between an upper surface 24 of the supporting portion 22 and a lower circumference 26 of the hinge pin 12.

The hinge pin supporting element 20 is formed as a strip element, the strip element being of a suitable material, for example metal, for example sheet metal. The strip element is shaped to provide the curve of pin supporting portion 22 which supports the hinge pin 12.

In addition to the aforementioned hinge pin supporting portion 22, the hinge pin supporting element 20 comprises a mounting portion 28 or a pair of mounting portions 28 joined to the pin supporting portion 22 by a leg or legs 29. The mounting portions 28 extend in opposite directions from the hinge pin supporting portion 22 and generally perpendicular to the hinge pin 12 and parallel to the plane of the valve housing 4 and provide a surface for securing the hinge pin supporting element 20 to the valve housing 4.

The mounting post 10 of the illustrated embodiment further includes a first pin location element 30, also referred to herein as a hinge pin location element 30. The hinge pin location element 30 is also formed as a strip element formed from a suitable material, such as a metal, for example sheet metal. The element 30 extends over and beyond the hinge pin support element 20 and has a curved hinge pin locating portion 32 which extends over the top of the hinge pin 12. The locating portion 32 is curved so as to correspond generally in shape to the shape of an upper circumferential surface 34 of the hinge pin 12. The hinge pin location element 30, in particular the locating portion 32, locates and restrains the hinge pin 12 vertically and laterally (in the sense of FIG. 2), minimising movement in directions away from the pin axis A. The locating portion 32 may extend through 180 degrees or more around the upper circumferential surface 34 of the hinge pin 12. However, the locating portion may, in other embodiments, extend for less than 180 degrees around the upper circumferential surface 34 of the hinge pin 12.

The hinge pin support element 20 and the hinge pin location element 30 in combination support and restrain the hinge pin 12. In order to maximise manufacturing tolerances, a distance S between the opposed surfaces of the hinge pin support element 20 and the hinge pin location element 30 may be greater than a diameter D of the hinge pin 12 to create a hinge pin clearance gap. More particularly, a distance between the upper surface 24 of the hinge pin supporting portion 24 and a lower surface 36 of the hinge pin locating portion 32 may be greater than the diameter of the hinge pin 12.

In embodiments where a hinge pin clearance gap is present, the hinge pin 12 will not rest on the hinge pin supporting portion 22 throughout the full opening and closing cycle of the check valve 2. When the flapper elements 14 are in the closed position, the hinge pin 12 rests within the flapper elements 14, above and separated from the supporting portion 22. As the flapper elements 14 open, the hinge pin 12 may contact the hinge pin locating portion 34, due to flow through the valve. During return from the open position, the hinge pin contacts the supporting portion 22 which prevents the hinge pin 12 from making contact with the central web 8. Upon closing, the hinge pin 12 returns to resting within the flapper elements 14.

The hinge pin location element 30 is also formed with a mounting portion 38, in the particular illustrated embodiment a pair of opposed mounting portions 38. The mounting portions 38 are connected to the hinge pin locating portion 32 by legs 39. As can be seen from FIG. 2, the mounting portions 38 extend in opposite directions from the hinge pin locating portion 32 generally perpendicular to the hinge pin 12 and generally parallel to the plane of the valve housing 4 and provide a surface for securing the hinge pin location element 30.

The mounting portions 28, 38 are in this embodiment of generally the same shape and size, so that the mounting portion 38 precisely covers the mounting portion 28. However, in other embodiments, the mounting portions 28, 38 may be of different sizes. For example, the mounting portions 28 may be wider and/or longer than the mounting portions 39.

The mounting posts 10 of the illustrated embodiment further comprise a second pin support element 40, also referred to as a stop pin support element 40. The stop pin support element 40 is similar to the hinge pin support element 20, but supports the stop pin 16. The stop pin support element 40 is arranged generally above the hinge pin locating element 30 and below the stop pin 16.

The stop pin support element 40 is also formed as a strip element of a suitable material, for example metal, for example sheet metal, having a curved supporting portion 42 for supporting the stop pin 16 through a tangential contact between an upper surface 44 of the supporting portion 42 and a lower circumference 46 of the stop pin 16.

The stop pin support element 40 is also formed with a mounting portion 48, in the particular illustrated embodiment a pair of opposed mounting portions 48. The mounting portions 48 are connected to the stop pin supporting portion 42 by legs 49. As can be seen from FIG. 2, the mounting portions 48 extend in opposite directions from the stop pin supporting portion 42 generally perpendicular to the hinge pin 12 and generally parallel to the plane of the valve housing 4 and provide a surface for securing the stop pin support element 40. The mounting portions 48 overlie the mounting portions 38 of the hinge pin location element 30. Again in these embodiments the mounting portions 48, 38 are coterminous, but that is not essential.

The mounting posts 10 of the illustrated embodiment further comprise a second pin location element 50, also referred to as a stop pin location element 50. The stop pin location element 50 is similar to the hinge pin location element 30, but acts to restrain and locate the stop pin 16.

The stop pin location element 50 is also formed as a strip element of a suitable material, for example metal, for example sheet metal, having a curved locating portion 52 which extends over the top of the stop pin 16. The locating portion 52 is curved so as to correspond to the shape of an upper circumference 54 of the stop pin 16. The stop pin location element 50, in particular the locating portion 52, locates and restrains the stop pin 16 vertically and laterally, minimising movement. As illustrated, the locating portion 52 extends through greater than 180 degrees for example 190 degrees or more around the upper circumference 54 of the stop pin 16 to provide a shape corresponding to that of the stop pin 16. However the angle of extent may be less than or equal to 180°.

In other embodiments, the locating portion 52 need not be complementary in shape to the upper circumference 54 of the stop pin 16. It could, for example simply contact it at selected points around the circumference, for example at its uppermost point and at opposed points on its diameter, for example at 90 degrees to the uppermost point.

The stop pin location element 50 is also formed with a mounting portion 58, in the particular illustrated embodiment a pair of opposed mounting portions 58. The mounting portions 58 are connected to the stop pin locating portion 52 by legs 59. As can be seen from FIG. 2, the mounting portions 58 extend in opposite directions from the stop pin locating portion 52 generally perpendicular to the hinge pin 12 and generally parallel to the plane of the valve housing 4 and provide a surface for securing the stop pin location element 50. The mounting portions 58 overlie the mounting portions 48 of the stop pin support element 40. Again in these embodiments the mounting portions 58, 48 are coterminous, but that is not essential.

In the embodiment of FIG. 2, the strip elements 20, 30, 40 and 50 are secured to the valve housing 4 with a pair of fasteners 64. Each fastener 64 extends through openings (not shown) in each mounting portions 28, 38, 48 and 58 on one side of the mounting post 10 and through the valve housing 4, in order to secure the elements to each other and to the valve housing 4. In one example, the fasteners 64 could comprise a nut-and-bolt.

Figure 3:
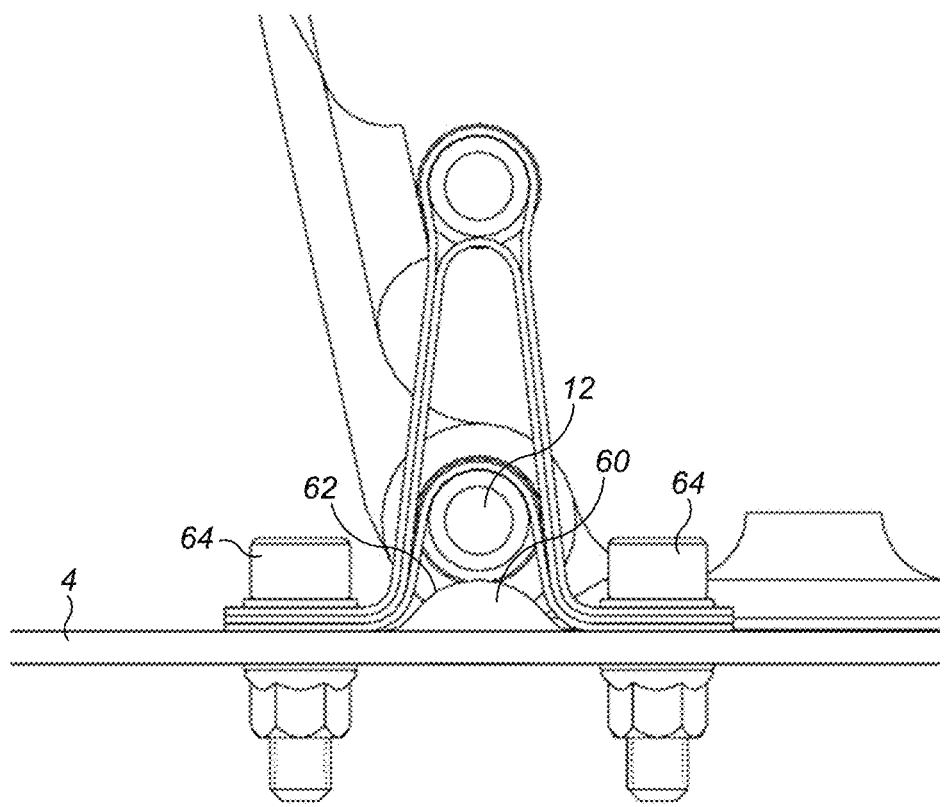
FIG. 3 shows a partial side view of an embodiment of the check valve of FIG. 1.

FIG. 3 shows an alternative embodiment of the check valve 2 in accordance with the disclosure. This embodiment is generally similar to that of FIG. 2, except that the first pin or hinge pin supporting element is an integral first support element 60 formed as part of the valve housing 4. The integral support element 60 might be integrally formed, for example, during a casting, or forging or pressing process forming the valve housing 4. The integral first support element 60 comprises an upper surface 62 which tangentially supports the hinge pin 12 at the lower circumference 26 of the hinge pin 12.

Also, in the embodiment of FIG. 3, the mounting portions 38 of the hinge pin supporting element 30 interface directly with the valve housing 4.

Figure 4:
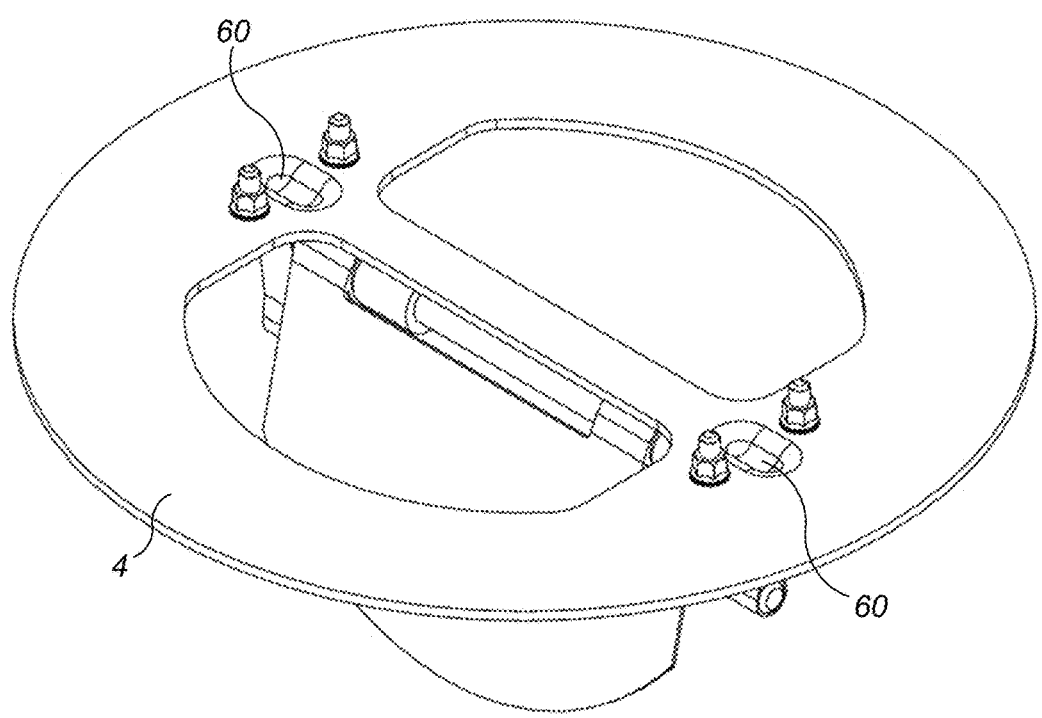
FIG. 4 shows an inverted view of the check valve of FIG. 3.

FIG. 4 is an inverted view of the check valve 2 of FIG. 3, showing the reverse side of the integral support element 60.

In addition or, in the alternative to, the fastener arrangement illustrated in FIGS. 1 to 3, the mounting portions 28, 38, 48 and 58 could be secured to each other and/or the valve housing 4 using one or more weld or braze joints at the respective surface interfaces.

Figure 5:
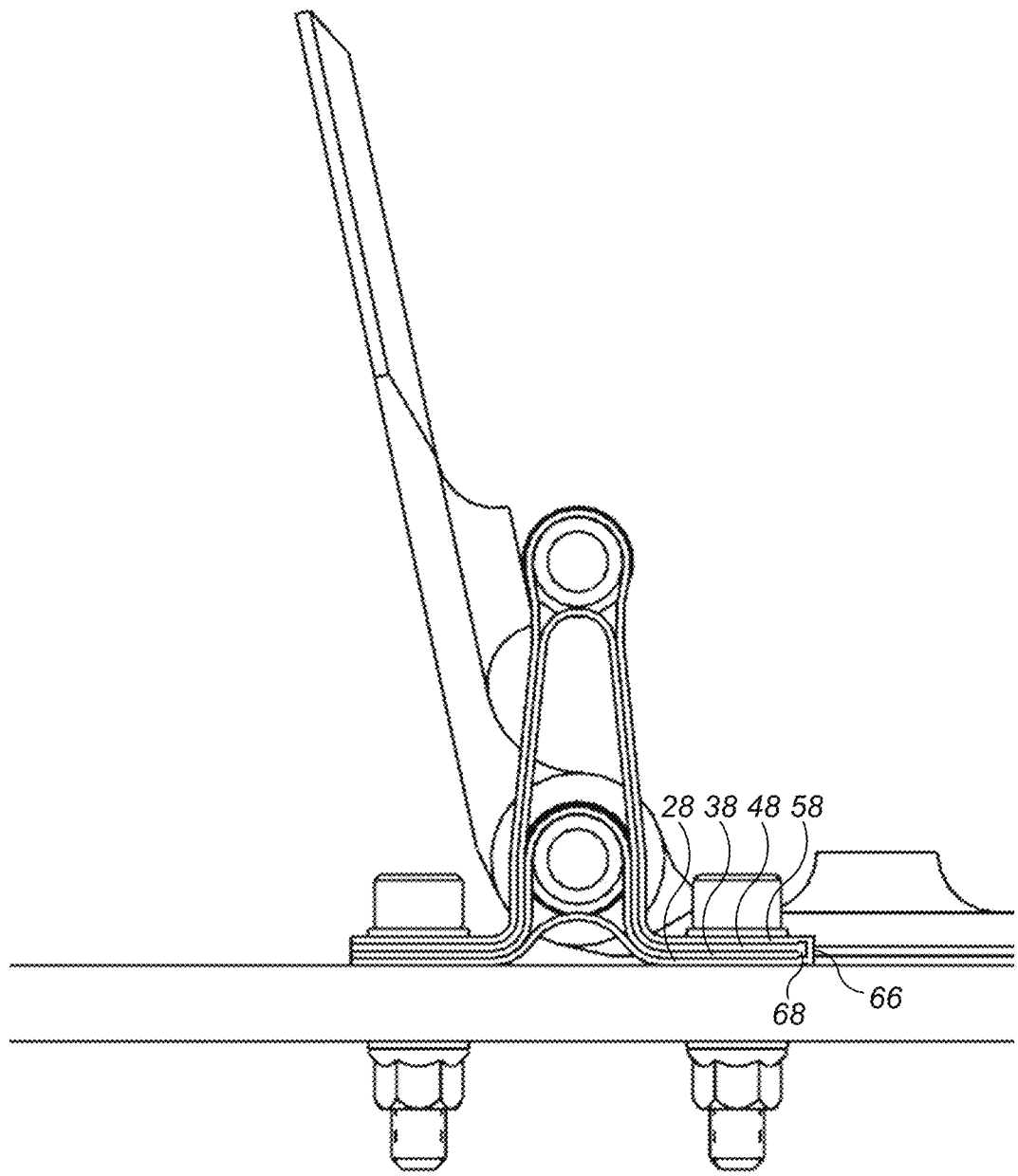
FIG. 5 shows a partial view of a further embodiment of the check valve in accordance with this disclosure.
Figure 6:
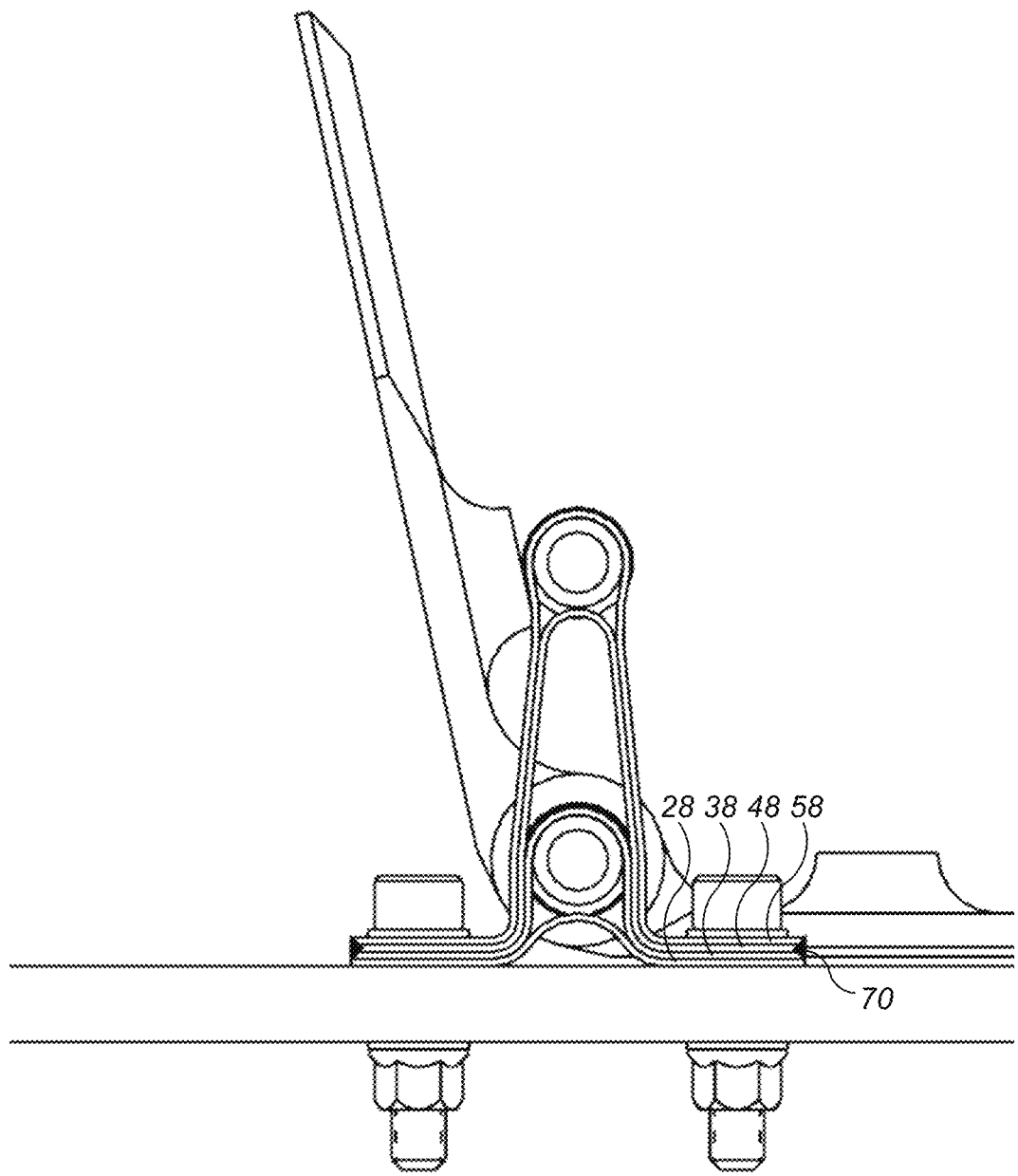
FIG. 6 shows a partial view of a further embodiment of the check valve in accordance with this disclosure.

With continued reference to FIGS. 1 and 2, FIG. 5 shows a further securing method for an embodiment with four strip elements 20, 30, 40 and 50. The hinge pin supporting element 20 is joined to the stop pin locating element 50 through a fold-back bend 66 which forms an extension of the mounting elements 28 and 58. That is, the hinge pin supporting element 20 and stop pin locating element 50 are a single, continuous strip element which is folded. Similarly, hinge pin locating element 30 and stop pin supporting element 40 are joined by a fold-back bend 68 to form a second single, continuous, folded strip element.

With continued reference to FIGS. 1 to 4, FIG. 6 shows an alternative securing means to that of FIG. 5. In this embodiment, the strip elements 20, 30, 40 and 50 are secured to each other at the ends of the respective mounting portions 28, 38, 48, 58 by a weld joint 70.

The securing means as described above could be used in various combinations as appropriate. For example, in the embodiment of FIG. 5, the ends of the mounting portions opposite the fold-back bends 66, 68 may be joined by welding.

In both embodiments described above, the strip elements 20, 30, 40 and 50 are secured to the valve housing 4 by the fasteners 64, although other arrangements may be possible, for example direct welding of the elements to the valve housing 4.

FIG. 7 shows a sectional view of the check valve 2 of FIG. 1. As illustrated, hinge pin 12 has a pair of end portions 72 with aforementioned diameter D joined by a central enlarged diameter portion 74, with a diameter greater than that of the end portions 72. This forms a pair of shoulders 76 which abut the hinge pin support element 20 and the hinge pin location element 30 to limit axial movement of the hinge pin 12.

A similar arrangement is present in the stop pin 16, which has a pair of end portions 78 joined by a central enlarged diameter portion 80 to form a pair of shoulders 82 which abut the stop pin support element 40 and the stop pin location element 50. This limits axial movement of the stop pin 16.

As discussed above, each of the strip elements, i.e. the hinge pin supporting element 20 and locating element 30, and the stop pin supporting element 40 and locating element 50, may be formed from a sheet metal. This provides an inexpensive but durable construction. Alternatively, some or all of the strip elements may be formed from other materials such as construction polymers or composite materials. Example composite materials could include carbon or glass filled polymers, such as carbon filled polyetheretherketone (PEEK).

The use of one or more strip elements 20, 30, 40 and/or 50 in the structure of the mount post 10 provides an easily manufacturable component which also has a low mass. The strip elements 20, 30, 40 and 50 can be easily manufactured by bending and cutting to an appropriate length.

In regular operation, the flapper elements 14 open and strike the stop post 16, causing wear to the supporting mounting post 10 and flapper element 14. The use of strip elements as disclosed provides a desirably resilient, elastically deformable mounting post 10 while meeting the structural requirements of the check valve 2.

The mounting post 10 also demonstrates progressive elasticity towards the uppermost end. That is, more material is present towards the base of the mounting post 10 around the hinge pin 12 than at the end where the stop pin 16 is mounted. This provides a desirable elasticity profile which further reduces wear from the flapper elements 14 while remaining structurally economical.

It will also be seen that the legs 29, 39, 49 of the respective strip elements are in sliding contact with one another. This will add a damping effect as the mounting post deflects.

Although the mounting post has been illustrated above using an embodiment where both pins are supported, it should be understood that in a valve falling within the scope of the disclosure just one of the pins may be supported by the elements disclosed, and the other pin be supported by other means.

Although the figures and the accompanying description describe particular embodiments and examples, it is to be understood that the scope of this disclosure is not to be limited to such specific embodiments, and is, instead, to be determined by the following claims.

The invention claimed is:

1. A valve housing for a check valve, the valve housing comprising:
   a housing body defining a valve opening;
   a first pin extending across the valve opening defining a pin axis (A);
   a pair of first pin support elements provided on the housing body on opposing sides of the valve opening and extending towards the first pin, the first pin support elements for contacting and supporting an under side of the first pin; and
   a pair of first pin location elements provided on the housing body on opposing sides of the valve opening, each first pin location element comprising a strip element having a pair of opposed mounting portions mounted to the housing body and a locating portion which extends over an upper side of the first pin and around at least an upper circumference thereof to locate the first pin;
   wherein at least one first pin support element comprises a second strip element having a mounting portion mounted to the housing body and overlapped by the mounting portion of one of the first pin location element, and a pin support portion arranged below the first pin.

2. The valve housing of claim 1, wherein mounting portions of the respective elements are joined by a braze or weld joint.

3. The valve housing of claim 1, wherein each mounting portion comprises a first mounting portion which extends away from the hinge pin in a first direction and a second mounting portion which extends away from the hinge pin in an opposite, second direction.

4. The valve housing of claim 3, further comprising:
   a fastener, passing through a respective first mounting portion of each strip element; and
   a second fastener passing through a respective second mounting portion of each strip element for fastening the strip elements to the housing body.

5. A valve housing for a check valve, the valve housing comprising:
   a housing body defining a valve opening;
   a first pin extending across the valve opening defining a pin axis (A);
   a pair of first pin support elements provided on the housing body on opposing sides of the valve opening and extending towards the first pin, the first pin support elements for contacting and supporting an under side of the first pin; and
   a pair of first pin location elements provided on the housing body on opposing sides of the valve opening, each first pin location element comprising a strip element having a pair of opposed mounting portions mounted to the housing body and a locating portion which extends over an upper side of the first pin and around at least an upper circumference thereof to locate the first pin, the mounting portions connected to the locating portion by legs,
   wherein the first pin is a hinge pin for mounting a pair of flapper elements;
   a second, stop pin arranged above and parallel with the hinge pin;
   a pair of stop pin support elements arranged above the hinge pin and below the stop pin, each stop pin support element comprising a third strip element having a stop pin supporting portion for contacting and supporting the stop pin and a mounting portion for mounting the stop pin supporting element to the housing body and overlapping the mounting portion of one of the first pin location elements.

* * * * *